United States Patent
May et al.

(10) Patent No.: US 8,966,488 B2
(45) Date of Patent: Feb. 24, 2015

(54) SYNCHRONISING GROUPS OF THREADS WITH DEDICATED HARDWARE LOGIC

(75) Inventors: Michael David May, Bristol (GB); Peter Hedinger, Bristol (GB); Alastair Dixon, Bristol (GB)

(73) Assignee: XMOS Ltd., London (GB)

( * ) Notice: Subject to any disclaimer, the term of this patent is extended or adjusted under 35 U.S.C. 154(b) by 1668 days.

(21) Appl. No.: 11/774,219

(22) Filed: Jul. 6, 2007

(65) Prior Publication Data
US 2009/0013323 A1 Jan. 8, 2009

(51) Int. Cl.
G06F 9/46 (2006.01)
G06F 9/38 (2006.01)
G06F 9/30 (2006.01)

(52) U.S. Cl.
CPC .......... *G06F 9/3851* (2013.01); *G06F 9/30087* (2013.01); *G06F 9/3009* (2013.01)
USPC ........................................................ 718/102

(58) Field of Classification Search
USPC ............................................ 712/22; 718/102
See application file for complete search history.

(56) References Cited

U.S. PATENT DOCUMENTS

| | | | | |
|---|---|---|---|---|
| 6,222,530 B1 * | 4/2001 | Sequeira | ....................... | 715/201 |
| 6,269,391 B1 * | 7/2001 | Gillespie | ....................... | 718/100 |
| 6,463,527 B1 * | 10/2002 | Vishkin | .................... | 712/245 |
| 6,560,655 B1 * | 5/2003 | Grambihler et al. | .......... | 709/248 |
| 6,574,725 B1 * | 6/2003 | Kranich et al. | ................. | 712/31 |
| 7,788,468 B1 * | 8/2010 | Nickolls et al. | .................. | 712/22 |
| 2002/0016879 A1 * | 2/2002 | Miller | ........................... | 710/200 |
| 2002/0073135 A1 * | 6/2002 | Meyer | ......................... | 709/107 |
| 2002/0116600 A1 * | 8/2002 | Smith et al. | .................... | 712/218 |
| 2002/0124241 A1 * | 9/2002 | Grey et al. | ..................... | 717/149 |
| 2005/0055594 A1 * | 3/2005 | Doering et al. | ............... | 713/375 |
| 2005/0251644 A1 * | 11/2005 | Maher et al. | ...................... | 712/2 |
| 2006/0271931 A1 * | 11/2006 | Harris et al. | ..................... | 718/1 |

FOREIGN PATENT DOCUMENTS

| | | |
|---|---|---|
| EP | 0602359 A2 | 6/1994 |
| WO | 03102758 A1 | 12/2003 |
| WO | 2005098624 A1 | 10/2005 |

OTHER PUBLICATIONS

Keckler et al. Exploiting fine-grain thread level parallelism on the MIT multi-ALU processor. [online](Jun. 1998). ACM, pp. 1-12. Retrieved From the Internet <http://citeseerx.ist.psu.edu/viewdoc/download?doi=10.1.1.13.2441&rep=rep1&type=pdf>.*

(Continued)

*Primary Examiner* — Camquy Truong
*Assistant Examiner* — Charlie Sun
(74) *Attorney, Agent, or Firm* — Sughrue Mion, PLLC

(57) ABSTRACT

The invention provides a processor comprising an execution unit arranged to execute multiple program threads, each thread comprising a sequence of instructions, and a plurality of synchronisers for synchronising threads. Each synchroniser is operable, in response to execution by the execution unit of one or more synchroniser association instructions, to associate with a group of at least two threads. Each synchroniser is also operable, when thus associated, to synchronise the threads of the group by pausing execution of a thread in the group pending a synchronisation point in another thread of that group.

57 Claims, 10 Drawing Sheets

(56) References Cited

OTHER PUBLICATIONS

Exploiting Fine-Grain Thread Level Parallelism on the MIT Multi-ALU Processor, Stephen W. Keckler, William J. Dally, Daniel Maskit, Nicholas P. Carter, Andrew Chang, Whay S. Lee, 1998, IEEE, p. 306-317.*

International Search Report and Written Opinion dated Nov. 4, 2008.

* cited by examiner

SYNCHRONISING GROUPS OF THREADS WITH DEDICATED HARDWARE LOGIC

FIELD OF THE INVENTION

The present invention relates to the synchronisation of program threads by means of hardware synchronisers.

BACKGROUND

Multi-threaded processors are processors which execute multiple concurrent program threads, each thread comprising a sequence of instructions. This concurrency may be achieved by scheduling threads in an interleaved manner, for example by issuing their instructions into the execution unit according to a round robin scheme. Concurrency may alternatively or additionally be achieved by parallel execution.

Program threads may interact or communicate with one another, such that dependencies may exist between threads. In this case, it is necessary to synchronise the execution of the threads in order to bring them to a common point of execution. For example, if a first thread is to generate some data which is to be operated upon by a second, then the generation of data by the first thread must occur before the operation by the second thread.

Ensuring this is not as straightforward for a software developer as simply arranging the dependent instructions in the correct order. The reason is that the different threads may be scheduled at different times for reasons that are unpredictable or beyond the software developer's control. For example, one improved approach to scheduling threads is discussed in our earlier U.S. application Ser. No. 11/717623, our ref. 314563.US, entitled "Processor Register Architecture", according to which a multi-threaded processor suspends the execution of threads pending specific activities such as input/output events from an external port. These external activities are typically unpredictable from the point of view of the processor.

Therefore a synchronisation scheme is required to ensure that an instruction in one thread does not attempt to execute before an instruction in another thread upon which it is dependent. This type of synchronisation is known in the art, and is referred to as "barrier synchronisation".

However, such synchronisation schemes must typically be coded into the threads themselves by the software developer, which is burdensome for the developer and also inefficient in terms of code density because a relatively large amount of code in each thread must be dedicated to achieving the required synchronisation. Further, the synchronisation code slows the program due to the additional memory accesses required.

SUMMARY OF THE INVENTION

The inventors have recognised a need to overcome the above problems. As such, it is an aim of the invention to provide a multi-threaded processor which allows thread synchronisation to be simplified from the software developer's point of view, and which also reduces synchronisation delay and increases synchronisation code density (i.e. reduces the amount of synchronisation code required).

According to one aspect of the invention, there is provided a processor comprising: an execution unit arranged to execute multiple program threads, each thread comprising a sequence of instructions; and a plurality of synchronisers for synchronising threads; wherein each synchroniser is operable, in response to execution by the execution unit of one or more synchroniser association instructions, to associate with a group of at least two threads; and wherein each synchroniser is operable, when thus associated, to synchronise the threads of said group by pausing execution of a thread in the group pending a synchronisation point in another thread of that group.

Because the synchronisation functionality is implemented in selectively associable and de-associable synchronisers which are separate from the threads, and preferably implemented in hardware, then the synchronisation can be invoked or triggered by only a small number of synchronisation instructions in each thread. That is, instead of coding the synchronisation operation directly into the threads, the synchronisation instructions refer responsibility of the synchronisation operation to a selected synchroniser, thus reducing code complexity and increasing code density in the threads. Particularly, a given synchroniser can be used to perform multiple synchronisations without needing to re-assign the group of threads.

This approach also improves the speed of the synchronisation, because the need for memory accesses is removed. Further, the resources of the present invention are flexibly shared by associating the synchronisers with different groups of synchronised threads as and when required. Thus the invention provides a flexible mechanism for synchronising program threads with reduced code and improved speed.

In embodiments, each synchroniser may comprise synchronisation registers operable to store information relating to the synchronisation of the threads in the associated group.

These synchronisation registers provide hardware functionality for storing synchronisation information such as which threads the synchroniser is associated with or whether a thread has reached a synchronisation point, again improving the amount and complexity of code required in each thread and reducing speed by reducing the need for memory accesses.

At least one of said synchronisers may be operable to perform multiple synchronisation operations on said group before de-associating from said group This means the synchroniser can pause and un-pause the threads of a group without terminating them. This advantageously avoids the need to repeatedly create and terminate threads for the purpose of synchronisation.

Each synchroniser may be operable to subsequently de-associate from said group in response to execution by the execution unit of at least one synchroniser de-association instruction.

The group may comprise a master thread and one or more slave threads.

Said synchronisation registers in each synchroniser may comprise one or more identifier registers operable to store one or more thread identifiers for use in associating the synchroniser with threads. At least one of said synchroniser association instructions may be a get slave instruction which, when executed by the execution unit, acts to store an identifier of a slave thread in one of said identifier registers. At least one of said synchroniser association instructions may be a get synchroniser instruction which, when executed by the execution unit, acts to store an identifier of said master thread in one of said identifier registers.

The processor may comprise a plurality of sets of thread registers, each thread register set being arranged to store information relating to a respective thread and to maintain that stored information if and whilst the respective thread is paused. One of said synchroniser association instructions may be a get synchroniser instruction which, when executed by the execution unit, acts to return an identifier of an available synchroniser to a thread register of the master thread. Each of said thread register sets may comprise at least one of: a plurality of operand registers for storing operands of the respective thread, a program counter register for storing a program count of the thread, and a status register for storing information determining how the thread reacts to events or interrupts.

Said synchroniser registers in each of the synchronisers may comprise a respective first flag operable to record whether the master thread has reached a synchronisation point. Said synchroniser registers in each of the synchronisers may comprise a respective second flag operable to record whether the one or more slave threads of said group are to be terminated once all threads in that group are synchronised.

The processor may comprise a hardware thread scheduler configured to maintain a set of runnable threads, wherein the synchronisers may be operable in conjunction with the thread scheduler to pause the respective threads by removing them from the set of runnable threads.

The master thread may include a master synchronise instruction which defines a synchronisation point in the master thread. When executed by the execution unit, the master synchronise instruction may cause the thread scheduler in conjunction with the associated synchroniser to determine whether all of the one or more slave threads in said group are paused, and on the condition that they are to un-pause the slaves of the group, and on the condition that they are not to pause the master thread. On the condition that all of the one or more slave threads in said group are not paused, the master synchronise instruction may assert the first flag of the associated synchroniser.

The master thread may include a master join instruction which defines a synchronisation point in the master thread. When executed by the execution unit, the master join instruction may cause the thread scheduler in conjunction with the associated synchroniser to determine whether all of the one or more slave threads in said group are paused, and on the condition that they are to terminate all of the slave threads of the group, and on the condition that they are not to pause the master thread. On the condition that all of the one or more slave threads of said group are not paused, the master join instruction may assert the first flag and the second flag of the associated synchroniser. On the condition that all of the one or more slave threads of said group are paused, the master join instruction may de-assert the second flag of the associated synchroniser.

The one or more slave threads may each include a slave synchronise instruction which each define a respective synchronisation point in the respective slave thread. When executed by the execution unit, the slave synchronise instruction may cause the thread scheduler in conjunction with the associated synchroniser to: determine whether there are any other slave threads in said group which are not paused; determine by reference to the first flag of the associated synchroniser whether the master thread of said group has reached its synchronisation point; on the condition that any other slave threads in said group are not paused or the master thread has not reached its synchronisation point, to pause the slave thread containing said slave synchronise instruction; and on the condition that there are no other slave threads in said group which are not paused and the master thread has reached its synchronisation point, to un-pause the master thread, to terminate the one or more slave threads if the second flag of the associated synchroniser is asserted, and to un-pause the one or more slave threads if the second flag of the associated synchroniser is not asserted.

The processor may comprise at least one port for communicating with an external device, wherein the thread scheduler may be operable to pause a thread pending a specified activity occurring at said port. The processor may comprise an interconnect system for establishing at least one channel between said sets of thread registers, wherein the thread register may be operable to pause a thread pending a specified activity occurring over said channel.

According to another aspect of the invention, there is provided a method of synchronising multiple program threads, each thread comprising a sequence of instructions, the method comprising: providing a plurality of synchronisers; associating one of said synchronisers with a group of at least two threads by executing one or more synchroniser association instructions; and operating said synchroniser to synchronise the threads of said group by pausing execution of a thread in the group pending a synchronisation point in another thread of that group.

According to another aspect of the invention, there is provided a mobile terminal having a processor comprising: an execution unit arranged to execute multiple program threads, each thread comprising a sequence of instructions; and a plurality of synchronisers for synchronising threads; wherein each synchroniser is operable, in response to execution by the execution unit of one or more synchroniser association instructions, to associate with a group of at least two threads; and wherein each synchroniser is operable, when thus associated, to synchronise the threads of said group by pausing execution of a thread in the group pending a synchronisation point in another thread of that group.

According to another aspect of the present invention, there is provided a computer program product for synchronising multiple program threads, each thread comprising a sequence of instructions, the program comprising code which when executed by a computer performs the steps of: associating one of a plurality of synchronisers with a group of at least two threads as a result of one or more synchroniser association instructions; and operating said synchroniser to synchronise the threads of said group by pausing execution of a thread in the group pending a synchronisation point in another thread of that group.

According to another aspect of the present invention, there is provided a processor comprising: execution means for executing multiple program threads, each thread comprising a sequence of instructions; and a plurality synchronisation means, each for associating with a group of at least two threads in response to execution by the execution means of one or more synchroniser association instructions; wherein each of the synchronisation means, when thus associated, is further for synchronising the threads of said group by pausing execution of a thread in the group pending a synchronisation point in another thread of that group.

DETAILED DESCRIPTION OF THE DRAWINGS

DETAILED DESCRIPTION OF THE PREFERRED EMBODIMENTS

Figure 1:
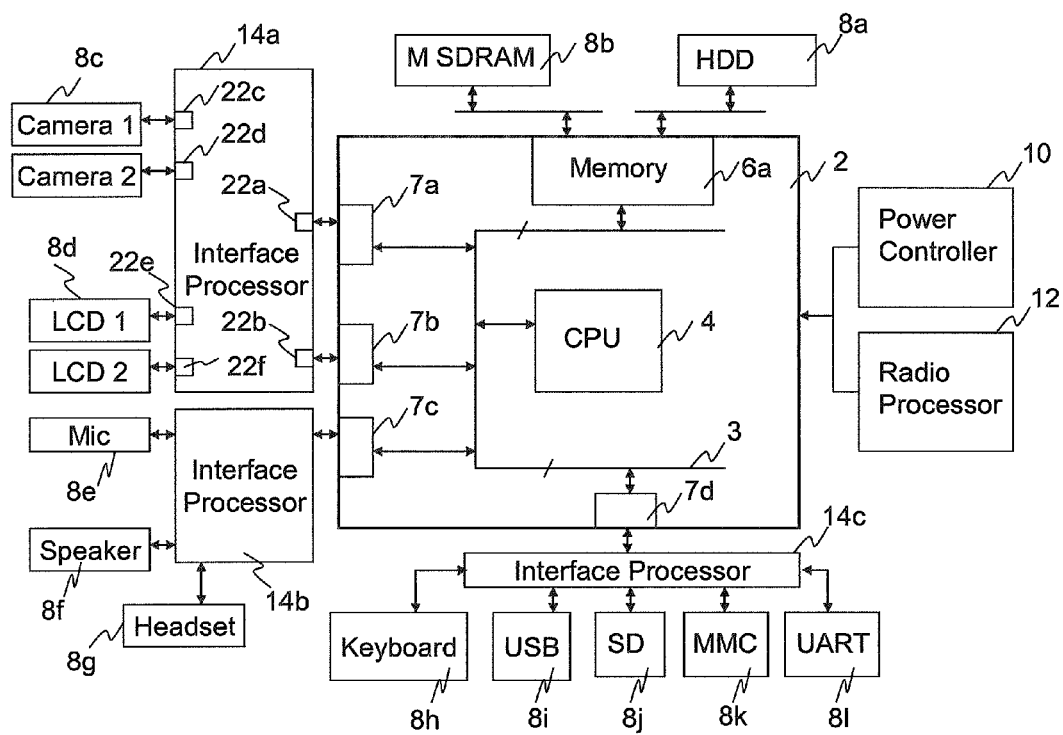
FIG. 1 illustrates an example application of an interface processor.

FIG. 1 shows an exemplary application of interface processors in a mobile telephone. The mobile applications processor 2 needs to communicate with the plurality of peripheral devices 8. The applications processor 2 comprises a bus 3, a CPU 4, and a memory controller 6*a* for interfacing with a hard-drive (HDD) 8*a* and a SDRAM memory 8*b*, as well as a power controller 10 and radio processor 12.

The arrangement of FIG. 1 allows the CPU 4 to communicate externally via generic ports 7. In this example, generic ports 7*a* and 7*b* are provided for interfacing with cameras 8*c* and LCD displays 8*d*; a generic port 7*c* is provided for interfacing with a microphone 8*e*, speaker 8*f* and headset 8*g*; and a generic port 7*d* is provided for interfacing with a keyboard 8*h*, a Universal Serial Bus (USB) device 8*i*, a Secure Digital (SD) card 8*j*, an Multi-Media Card (MMC) 8*k*, and a Universal Asynchronous Receiver/Transmitter (UART) device 8*l*.

In FIG. 1, interface processors 14*a*, 14*b* and 14*c* are placed at the outputs of the relevant ports 7, with a first interface processor 14*a* being connected between the image devices 8*c*-8*d* and the generic ports 7*a*-7*b*, a second interface processor 14*b* being connected between the audio devices 8*e*-8*g*, and a third interface processor 14*b* being connected between the generic port 7*d* and the various connectivity devices 8*h*-8*m*. The ports 7 need only be general purpose ports because the application-specific display, audio and connectivity functions are implemented by the interface processors 14*a*-14*c* in a manner to be described later. The ports 7 need not to use FPGA logic, because the interface processors 14 provide the flexibility and configurability that would otherwise be provided by FPGAs. The interface processor 14*a* has ports 22*a* and 22*b* connected to the ports 7*a* and 7*b*, and ports 22*c*, 22*d*, 22*e* and 22*f* connected to the external devices 8*c* and 8*g*. The interface processors 14*b* and 14*c* have similar ports, not shown in FIG. 1.

The interface processors are typically involved in implementing the specific protocols used to transfer data via the interfaces, re-formatting data including converting it between parallel and serial formats, and possibly higher level functions such as encoding it, compressing it or encrypting it.

An important feature of the interface processor which is discussed more fully in the following is its ability to manage communications, both internal and external. Each interface processor comprises a CPU, memory and communications. To allow the direct and responsive connectivity between the CPU and the ports, each processor has hardware support for executing a number of concurrent program threads, each comprising a sequence of instructions, and at least some of which may be responsible for handling communications. As will be discussed more fully in the following, the hardware support includes:
  a set of registers for each thread,
  a thread scheduler which dynamically selects which thread to execute,
  a set of ports used for input and output (ports 22),
  an interconnect system for establishing channels between threads, and
  a set of synchronisers for synchronising the execution of different threads.

The provision of a small set of threads on each processor can be used to allow communications or input/output to progress together with other pending tasks handled by the processor, and to allow latency hiding in the interconnect by allowing some threads to continue whilst others are suspended pending communication to or from remote interface processors.

Figure 2:
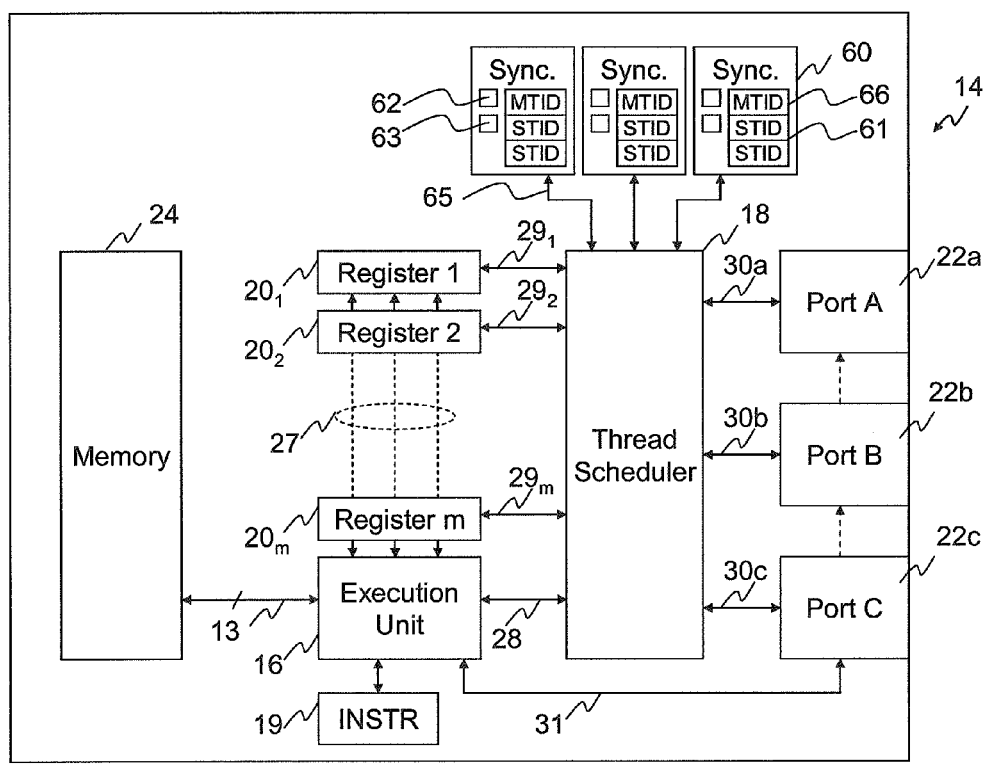
FIG. 2 is a schematic representation of the architecture of an interface processor.

FIG. 2 shows schematically an exemplary architecture of an interface processor 14 according to one embodiment of the present invention. The processor 14 comprises an execution unit 16 for executing threads of instructions under the control of a thread scheduler 18, and a set of synchronisers 60 for synchronising threads. These synchronisers are discussed in further detail below. The processor 14 further comprises a Random Access Memory (RAM) 24 for holding program code and other data, and a Read Only Memory (ROM) (not shown) for storing permanent information such as boot code.

The thread scheduler 18 dynamically selects which thread the execution unit 16 should execute. Conventionally, the function of a thread scheduler would simply be to schedule threads from the program memory in order to keep the processor fully occupied. However, according to the present invention, the scheduling by the thread scheduler 18 is also related to activity at the ports 22, activity occurring over channels between threads, and to the synchronisation of threads.

Each of the m threads under consideration by the thread scheduler 18 is represented by a respective set of thread registers $20_1 \ldots 20_m$ in a bank of registers 20, to which the thread scheduler 18 has access. Instruction buffers (INSTR) 19 are also provided for temporarily holding instructions fetched from memory 24 before being subsequently issued into the execution unit 16. Data can be communicated between register sets 20 via channels. The details of these registers and channels are discussed later.

Of the m threads, the thread scheduler 18 maintains a set of n runnable threads, the set being termed "run", from which it takes instructions in turn, preferably in a round-robin manner. When a thread is unable to continue it is suspended by removing it from the run set. The reason for this may be, for example, because the thread is awaiting one or more of the following types of activity:
  its registers are being initialised prior to it being able to run,
  it has attempted an input from a port or channel which is not ready or has no data available,
  it has attempted an output to a port or channel which is not ready or has no room for the data,
  it has executed an instruction causing it to wait for one or more events which may be generated when ports or channels become ready for input,
  it is waiting to synchronise with another thread before continuing, or
  it is waiting to synchronise with another thread before terminating (a join).

Note that the term "event" as used herein refers to a particular type of operation, which is slightly different from basic input-output operation. The distinction is discussed below in relation to FIGS. 3 and 4.

Advantageously, in order to facilitate rapid reaction time, a direct hardwired connection 28 is provided between the thread scheduler 18 and the execution unit 16 to allow the thread scheduler 18 to control which thread or threads the execution unit 16 should fetch and execute. Direct hardwired paths 30*a*, 30*b*, 30*c* are also provided between the thread scheduler 18 and each of the ports 22; and direct hardwired paths $29_1 \ldots 29_m$ are provided between the thread scheduler 18 and each of the registers 20. These direct paths preferably provide control paths which allow the thread scheduler to associate a respective thread with one or more of the ports 22, and particularly to return ready indications from the ports when certain activity occurs, allowing the processor to respond quickly to activity or stimuli occurring at the ports 22. The operation of the thread scheduler in relation to the ports is discussed below with regard to FIGS. 3 and 4.

The execution unit 16 also has access to each of the ports 22a-22c and each of the registers $20_1$-$20_m$ via direct connections 27 and 31, thus providing a direct link between the core processor, registers, and the external environment. Preferably, these direct paths provide further control paths allowing the execution unit to pass conditions to the ports. This is discussed in further detail below with regard to FIG. 3. The direct paths 27 and 31 may also allow data to be input and output directly between the thread registers 20 and the ports 22, thus allowing threads to communicate directly with the external environment. For example, data may be written directly from an external device to one of a thread's operand registers, rather than being written to memory 24 and then subsequently fetched. Conversely, following an operation, data from an operand register may be picked up by the execution unit 16 and sent directly out of a port 22. This improves reaction time significantly.

Further, the thread scheduler 18 preferably has direct hard-wired connections 65 with the synchronisers 60 in order to facilitate rapid synchronisation. As will be discussed later, the synchronisers 60 operate closely in conjunction with the thread scheduler 18 in order to pause and un-pause threads so as to synchronise their execution, and these direct connections 65 facilitate rapid reaction when a thread reaches a point of synchronisation.

Note that by "direct connection" or "direct path" it is meant a connection separate from the connection between the execution unit and the program memory 24. Thus, for example, the thread scheduler 18 and execution unit 16 have access to data input from ports 22 without that data being stored and then subsequently fetched from memory 24. Particularly, if the connection between the execution unit 16 and memory 24 is via a system bus 13, then a "direct" connection or path means one which is separate from that bus. Thus the various communications between ports 22, registers 20, thread scheduler 18, synchronisers 60 and execution unit 16 can all occur without the need for bus arbitration or memory access, improving reaction time. The ports 22 may also be provided with an additional connection (not shown) with the bus 13.

Figure 3:
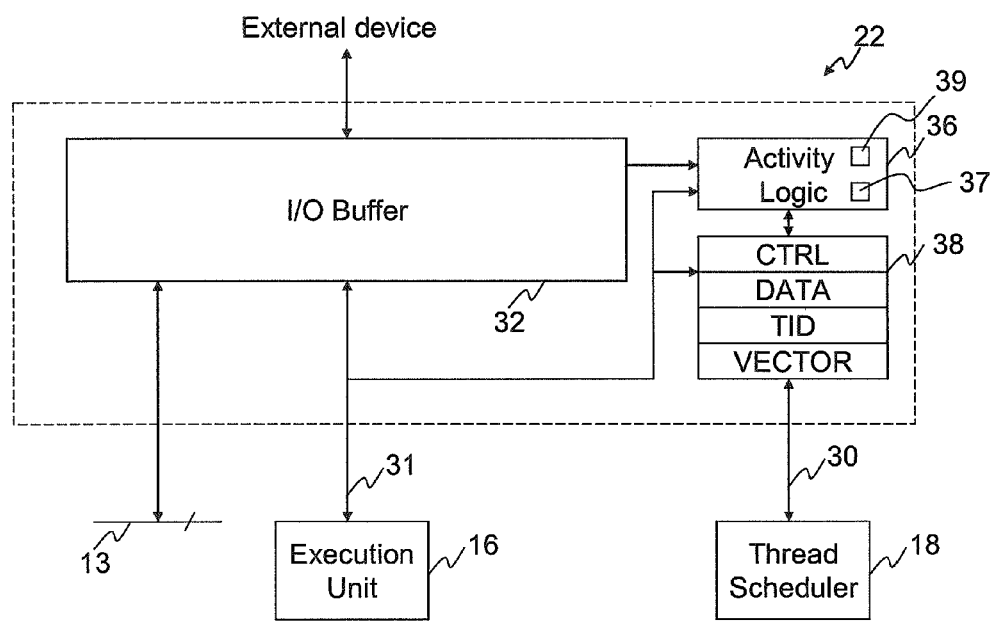
FIG. 3 is a schematic representation of a port.

FIG. 3 shows schematically a port 22 according to a preferred embodiment of the invention. The port 22 comprises an I/O buffer 32 for passing input and output data to and from the processor 14. In addition, each port 22 comprises activity handling logic 36 for monitoring activity occurring at the port and signalling the occurrence of certain activity by means of at least one ready bit or flag 37. The ready flag 37 is preferably signalled to the thread scheduler via direct path 30. Potential activity which the port may detect includes:
data has been input to the port,
some specific data has been input to the port, and/or
the port has become available for output.

To facilitate the detection of such activity, the port 22 is provided with a set of registers 38. These comprises a thread identifier (TID) register for storing an identification of the relevant thread, a control (CTRL) register for storing one or more conditions, a continuation point vector (VECTOR) register for storing the position in the program where execution was suspended, and a data (DATA) register for storing any data associated with a condition. The value TID is written to the registers 38 by the thread scheduler 18 via the direct path 30 (which would be 30a, 30b, 30c in FIG. 3), and the values VECTOR, CTRL and DATA are written by the execution unit 16 via the direct path 31. The TID is returned to the thread scheduler 18 upon detection of the desired activity in order to identify the associated thread. The activity logic also comprises an enable flag 39, which is discussed in further detail below.

Note that although the registers 38 are shown in FIG. 3 as being contained within the port 22, they may in fact be situated elsewhere within the processor 14 and simply associated with the port 22.

Figure 4:
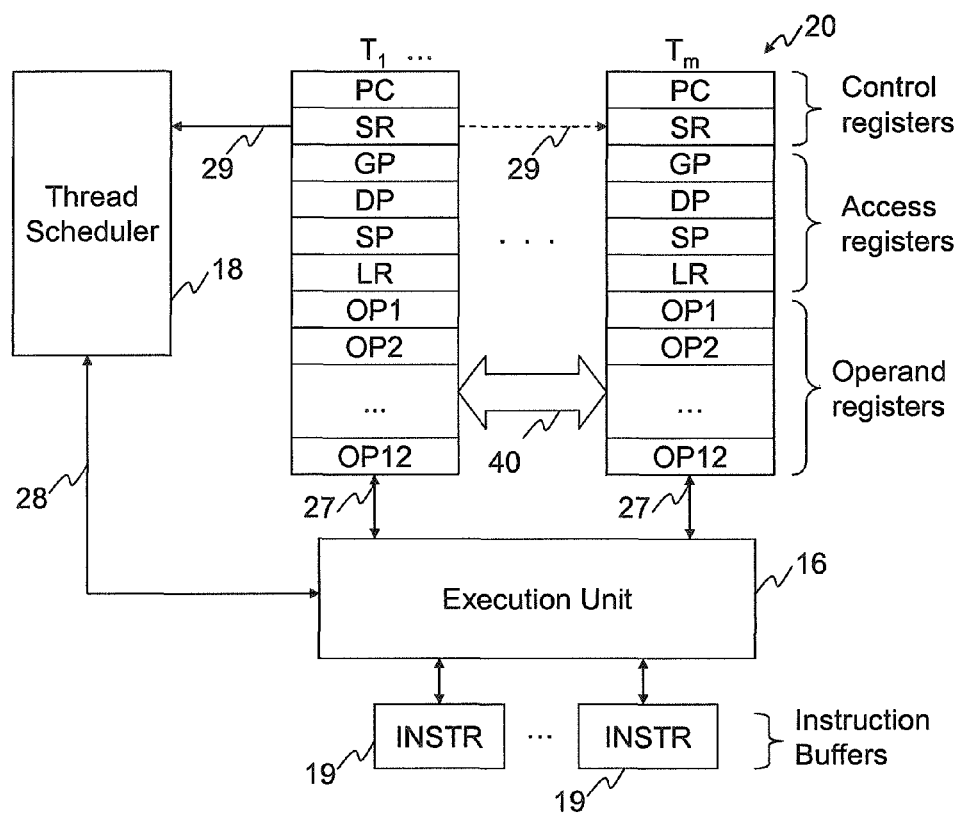
FIG. 4 is a schematic representation of thread register sets.

FIG. 4 shows an exemplary bank of thread registers 20 used to represent the threads. The bank 20 comprises a plurality of sets of registers corresponding to respective threads $T_1$ to $T_m$ which are currently under consideration by the thread scheduler 18. In this preferred example, the state of each thread is represented by eighteen registers: two control registers, four access registers, and twelve operand registers. These are as follows.

Control Registers:
PC is the program counter
SR is the status register
Access Registers:
GP is the global pool pointer
DP is the data pointer
SP is the stack pointer
LR is the link register
Operand Registers: OP1 . . . OP12

The control registers store information on the status of the thread and for use in controlling execution of the thread. Particularly, the ability of a thread to react to events or interrupts is controlled by information held in the thread status register SR. The access registers include a stack pointer used for local variables of procedures, a data pointer normally used for data shared between procedures and a constant pool pointer used to access large constants and procedure entry points. The operand registers OP1 . . . OP12 are used by instructions which perform arithmetic and logical operations, access data structures, and call subroutines. As discussed in relation to FIGS. 5 and 6, the processor also comprises an interconnect system 40 for establishing channels between the operand registers OP of different sets 20.

A number of instruction buffers (INSTR) 19 are also provided for temporarily storing the actual instructions of the thread. Each instruction buffer is preferably sixty-four bits long, with each instruction preferably being sixteen bits long, allowing for four instructions per buffer. Instructions are fetched from program memory 24 under control of the thread scheduler 18 and placed temporarily in the instruction buffers 19.

The execution unit 16 has access to each of the registers 20 and buffers 19. Further, the thread scheduler 18 has access to at least the status register SR for each thread.

As mentioned above, the term "event" as used herein refers to a particular type of operation, or to the activity corresponding to that particular type of operation. Event based operations are slightly different from basic input-output operations, and work as follows. An event is first set for a thread by transferring a continuation point vector from the execution unit 16 and a thread identifier from the thread scheduler 18 to the VECTOR and TID registers 38 associated with a port 22, preferably via direct paths 31 and 30. An associated condition and condition data may also be written to the CTRL and DATA registers 38 of the port 22. The event is thus set at the port, but not necessarily enabled. To enable the port to generate an indication of an event, the port's enable flag 39 must also be asserted, preferably by the thread scheduler 18 via direct path 30. Further, to enable the thread itself to accept events, the thread's event enable (EE) flag in the respective status register SR for the thread must be set to event-enabled. Once the event is thus set and enabled, the thread can be suspending awaiting the event using an event-based wait instruction which acts on the thread scheduler 18. At this point, the current pending instruction may be discarded from the relevant instruction buffer 19. When the event occurs, e.g. some data is input to the port, the occurrence is signalled by the return of the thread identifier and continuation point vector from the port 22 to the thread scheduler 18 and execution unit 16 respectively, allowing the instruction identified by the continuation point vector to be fetched from program memory 24 into an instruction buffer 19 and execution resumed at the appropriate point in the code. For example, if the awaited event is the input of some particular data, then the continuation point vector may identify code including an input instruction for inputting the data.

When the event occurs, the thread's EE flag in the respective status register SR may be set to event-disabled to prevent the thread from reacting to events immediately after the occurs. The enable flag 39 may be de-asserted as a result of the thread executing instructions when the event occurs.

The enable flag 39 can be asserted whilst setting up a number of ports in preparation for waiting for an event from one or more of the ports. The thread's EE flag may also be set to event-enabled prior to enabling a set of port enable flags and in this case the first port to be enabled which is ready will generate and event causing the current instruction to be discarded and execution to proceed by immediately fetching and executing the instruction at the continuation point vector.

The advantage of the port's enabling flag 39 and status register EE flag is that the enabling and disabling of events is separated from both the setting up of the events and the suspension of a thread by a wait instruction, allowing different input and output conditions to be readily toggled on and off for a particular thread and/or for various different threads. For example, an event may be left set up at a port 22 even though the event is disabled. Thus events may be re-used by a thread because, although the event has already occurred once, the thread identifier, continuation point vector and condition are still stored in the TID, VECTOR, CTRL and DATA registers 38 of the port 22. So if the thread needs to re-use the event, the port's registers 38 do not need to be re-written, but instead the port's enable flag 39 can simply be re-asserted and/or the EE flag in the status register SR for a thread can be re-set to event-enabled. A further wait instruction will then suspend the thread pending a re-occurrence of the same event.

Furthermore, the use of continuation point vectors allows multiple events to be enabled per thread. That is, a given thread can set up one event at one port 22a by transferring a continuation point vector to that port, set up another event at another port 22b by transferring a different continuation point vector to that other port, and so forth. The thread can also enable and disable the various events individually by separately asserting or de-asserting the different enable flags 39 for each respective port. A wait instruction will then cause the thread to be suspended awaiting any enabled event.

Figure 5:
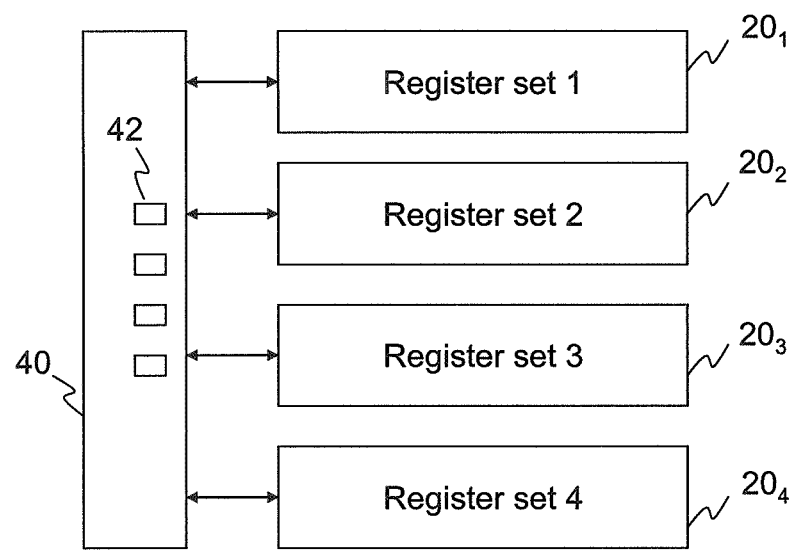
FIG. 5 is a schematic representation of an interconnect between thread register sets.
Figure 6:
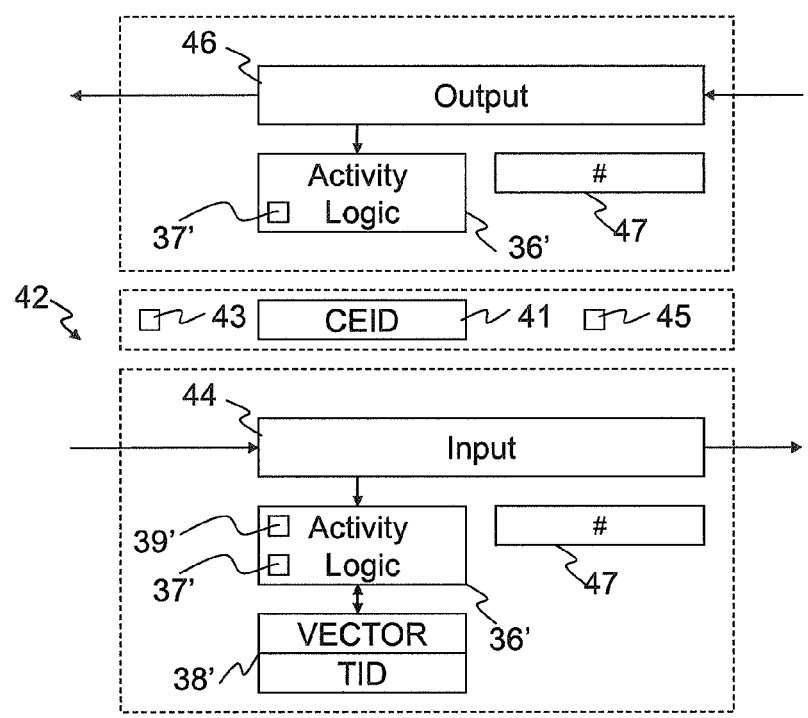
FIG. 6 is a schematic representation of a channel end.

In contrast with events, basic I/O operations use only an input or output instruction without a prior event set-up. Using basic I/O operations, the thread scheduler 18 does not transmit a continuation point vector to the VECTOR register, and does not use the port's enable flag 39 or the EE flag in the status register SR. Instead, the pending input or output instruction is simply left in an instruction buffer 19 and if necessary the input or output instruction acts on the thread scheduler 18 to cause execution to be paused pending either an input of data or the availability of the port for output, as indicated by the ready flag 37. If the port is ready straight away, i.e. the ready flag 37 is already set when the input or output instruction is executed, then the thread will not be paused. In embodiments, only the TID register may be required for scheduling according to a basic I/O. A basic I/O may or may not use a condition in the CTRL and DATA registers. If such a condition is not used, the I/O will simply be completed as soon as the port is ready. The basic I/O operation pauses and un-pauses the thread but does not effect the port's enable flag 39 or the EE flag in the status register, nor transfer control to the event vector Similar event and I/O techniques can also be applied to communication between threads, or more accurately between the thread register sets 20 which store information relating to the threads. FIG. 5 shows an interconnect system 40 for establishing channels. For illustrative purposes, only four thread register sets $20_1$ to $20_4$ are shown in FIG. 6, each storing information for a respective thread $T_1$ to $T_4$. Each of the thread register sets is connected to each of the other sets by the interconnect system 40, which is a direct hardware interconnect operable to establish at least one channel for transferring data directly between at least two of the thread register sets 20. The interconnection is direct in the sense that it does not use a Direct Memory Access (DMA) and the transfer does not occur via any shared memory such as the RAM 24, nor via any general purpose system bus such as the bus 13. Channels are preferably used to transfer data to and from the operand registers OP, but could in principle be used to transfer information to or from other types of register such as a status register SR. The thread scheduler 18 can schedule threads based on activity occurring over channels in a similar manner as discussed in relation to ports above. The general term used herein to cover ports, channels, and other sources of activity is "resource".

The interconnect system 40 comprises a plurality of hardware channel ends 42 for use in establishing channels between threads. Each channel end can be allocated to any of the thread register sets 20, and each channel end 42 is connectable to any other channel end 42, by means of the interconnect system 40. For illustrative purposes only four channel ends are shown in FIG. 6, but it will be appreciated there may be different numbers and in general there may not be the same number of channel ends 42 as there are register sets 20.

As shown in FIG. 6, each of the channel ends 42 preferably resembles a pair of ports, with an input buffer 44 and an output buffer 46 to provide full-duplex data transfer between threads (although a single buffer is also an option). The input buffer 44 is operable to input data from another channel end 42 to the register set 20 of a thread, and the output buffer 46 is operable to output data from the register set 20 of the thread to the other channel end 42.

As with the ports 22, each channel input buffer 44 and output buffer 46 may be associated with activity handling logic 36' for monitoring activity occurring over a channel and signalling the occurrence of certain activity by means of at least one ready flag 37'. Potential activity may be that data has been input to the channel, or that the channel has become available for output. If an output instruction is executed when the channel is too full to take the data then the thread scheduler 18 pauses that instruction and restarts or re-issues it again when there is enough room in the channel for the instruction to successfully complete. Likewise, when an input instruction is executed and there is not enough data available then the thread scheduler 18 pauses the thread until enough data does become available. Counters 47 in the channel end 42 keep a record of the amount of data in the input buffer 44 and output buffer 46.

In order to establish a channel between two sets of thread registers, two channel ends must be allocated and connected. As mentioned above, each channel end can be allocated to any thread and each channel end 42 is connectable to any other channel end 42. To facilitate the allocation and connection of channel ends 42, each end 42 also comprises a channel end identifier register CEID 41 which records which other channel end that end is connected to, a connected flag 43 which records whether the channel end is connected, and a claimed flag 45 which records whether the channel end has been claimed by a thread.

In order to allocate respective channel ends 42 to each of the two threads, two respective "get channel end" instructions are executed, each of which instructions reserves a channel end 42 for use by the thread. These instructions also each assert the claimed flag 43 of the respective channel end 42. A respective "get channel end" instruction may be executed in each of the two threads, or both "get channel end" instructions may be executed by one master thread.

The channel ends are then connected together by exchanging channel end identifiers as follows. When an output instruction of a first thread is executed in order to perform an output to the channel end of a second thread, the connected flag 43 in the second thread's channel end is used to determine whether the second thread's channel end is currently connected. If the second thread's channel end is not connected, the data supplied to that channel end is interpreted as an identifier of the first thread's channel end. This identifier is recorded in the CEID register 41 of the second thread's channel end and the connected flag 43 of the second thread's channel end is asserted. Reciprocally, an output instruction of the second thread is then executed to perform an output to the first channel end. Assuming the connected flag 43 of the first thread's channel end is not yet asserted, the data supplied to the first thread's channel end is interpreted as the identifier of the second thread's channel end. This identifier is recorded in the CEID register 41 of the first thread's channel end and the connected flag 43 of the first thread's channel end is asserted.

Once the channel ends 42 are connected, any output to the second channel end will determine the associated first channel end from the record in the second channel end's identifier register CEID 41. If there is enough room in the input buffer of the second channel end to hold the data, the data will be transferred; otherwise the first thread's output instruction is paused. The supply of data to the second channel end by the output instruction may also un-pause the second thread if it was paused pending input to the second channel end, allowing it to take data. Similarly, if the effect of the second thread inputting data from the second channel end is to make space for data from a paused output of the first thread from the first channel end, this will un-pause the first thread's output allowing it to complete execution. The input may also trigger events (see below). For each thread, the thread scheduler 18 keeps a record of any paused output instruction, its associated data, and the channel end to which it is attempting to transfer data.

Once the channel is no longer needed, channel ends 42 can be disconnected by executing an instruction which outputs an "end of message" (EOM) control token. The channel ends 42 will then be available for connection with any other channel ends. Also, channel ends 42 can be freed from a thread by executing a "free channel" instruction. The channel ends 42 will then be freed for use by any other threads.

Again as with the ports 22, in order to facilitate the reaction to activity occurring over the channel, the input buffer 44 of each channel end 42 is associated with registers 38'. These comprise a thread identifier (TID) register for storing an identification of the relevant thread, and a continuation point vector (VECTOR) register for storing the position in the program where execution should resume upon occurrence of an event. These TID and VECTOR registers can then be used by the thread scheduler 18 and execution unit 16 to schedule threads in dependence on events, in the same manner as with the ports 22. That is, by storing a thread identifier and continuation point vector for the thread in order to set up an event, suspending the thread using a wait instruction, and then returning to a point in the code specified by the continuation point vector once the event has occurred. The event in this case would be the input of data to the channel end 42. The VECTOR register also allows the channel to generate interrupts. The channel end also has an enable flag 39' to enable the channel to generate events. In preferred embodiments, the channel ends 42 may not be provided with CTRL and DATA registers, although that possibility is not excluded.

Note that to minimise communications delay, the input and output instructions for transferring data over channels may advantageously act directly on the thread scheduler 18. That is, when executed by the execution unit 16, the instruction causes the thread scheduler to pause the relevant thread by removing it from the run set, provided that the ready bit 37' for that channel does not currently indicate that the channel is ready. Similarly, event-based wait instructions will cause the thread scheduler to suspend execution of the thread provided that the event has not occurred, the thread's event enable flag EE is not set in the thread's status register SR, and/or the channel end's event enable flag is not asserted.

The interface processor can support several programming approaches due to its thread-based structure. It can be treated as a single conventional processor performing standard input and output, or it can be programmed as part of a parallel array of hundreds of communicating components. An instruction set is provided which supports these options. The instruction set includes special instructions which support initialisation, termination, starting and stopping threads and provide input/output communication. The input and output instructions allow very fast communications with external devices. They support high-speed, low-latency input and output and high-level concurrent programming techniques. Their application therein to handling port and channel activity is discussed more fully in the following, which describes example instructions that can be used to implement the present invention.

Resources are firstly reserved for a thread using a GETR instruction specifying the type of resource required, and can be freed again using a FREER instruction.

Ports can be used in input or output mode. In input mode a condition can be used to filter the data passed to the thread. A port can be used to generate events or interrupts when data becomes available as described below. This allows a thread to monitor several ports, only servicing those that are ready. Input and output instructions, IN and OUT, can then be used to transfer of data to and from ports once ready. In this case, the IN instruction inputs and zero-extends the n least significant bits from an n-bit port and the OUT instructions outputs the n least significant bits.

Two further instructions, INSHR and OUTSHR, optimise the transfer of data. The INSHR instruction shifts the contents of a register right by n bits, filling the left-most n bits with the data input from the n-bit port. The OUTSHR instruction outputs the n least significant bits of data to the n-bit port and shifts the contents of a register right by n bits.

| | | |
|---|---|---|
| OUTSHR port, s | port◁s[bits 0 for width(port)];<br>s ← s >> width(port) | output from<br>port & shift |
| INSHR port, s | s ← s >> width(d);<br>port▷s[bits (bitsperword − width(d))<br>for width(d)] | shift & input<br>from port | where the "▷" represents an input and the "◁" represents an output.

A port must be configured before it can be used. It is configured using the SETC instruction which is used to define several independent settings of the port. Each of these has a default mode and need only be configured if a different mode is needed.

SETC port, mode port[ctrl]←mode set port control

The effect of the SETC mode settings is described below. The first entry in each setting is the default mode.

| Mode | Effect |
|---|---|
| OFF | port not active; pin(s) high impedance |
| ON | active |
| IN | port is an input |
| OUT | port is an output (but inputs return the current pin value) |
| EVENT | port will cause events |
| INTERRUPT | port will raise interrupts |
| DRIVE | pins are driven both high and low |
| PULLDOWN | pins pull down for 0 bits, are high impedance otherwise |
| PULLUP | pins pull up for 1 bits, but are high impedance otherwise |
| UNCOND | port always ready; inputs complete immediately |
| EQUAL | port ready when its value is equal to its DATA value |
| NE | port ready when its value is different from its DATA value |
| TRANSITION | port ready when its value changes towards its DATA value |
| GR | port ready when its value is greater than its DATA value |
| LS | port ready when its value is less than its DATA value |

The DRIVE, PULLDOWN and PULLUP modes are only relevant when the port direction is OUT. The TRANSITION condition is only relevant for 1-bit ports and the GR and LS conditions are only relevant for ports with more than one bit.

Each port has a ready bit 37 which is used to control the flow of data through the port, and defines whether the port is able to complete input or output instructions. The ready bit is set in different ways depending on the port configuration. The ready bit is cleared when any of the SETC, SETD or SETV instructions are executed.

A port in input mode can be configured to perform conditional input. The condition filters the input data so that only data which meets the condition is returned to the program. When a condition is set, the IN and INSHR instructions will only complete when the port is ready. As described above, executing an input instruction on a port which is not ready will pause the thread. When ready, the port sets its ready bit which is signalled to the thread scheduler. The thread is then resumed, either by restarting the paused instruction within the pipeline or re-executing the instruction by re-issuing it into the pipeline. The data is then returned and the ready bit 37 is cleared.

Once a port ready bit is set, the data value which satisfied the condition is captured so that the software gets the value which met the condition even if the value on the port has subsequently changed. When an IN or INSHR instruction is executed and the ready bit is set then the data is returned and the ready bit cleared. If the ready bit is not set then the thread is paused until the ready bit is set. If a condition is set then the data is compared against the condition and the ready bit is only set when the condition is met.

When the OUT or OUTSHR instruction is executed if the ready bit is clear then the data is taken by the port and the ready bit is set. If the ready bit is set then the thread is paused until it is cleared by the port.

Communication between threads is performed using channels, which provide full-duplex data transfer between ends, whether the ends are both in the same processor, in different processors on the same chip, or in processors on different chips. Channels carry messages constructed from data and control tokens between two channel ends. The control tokens are used to encode communications protocols. Although most control tokens are available for software use, a number are reserved for encoding the protocol used by the interconnect hardware, and cannot be sent and received using instructions.

A channel end can be used to generate events and interrupts when data becomes available as described below. This allows the thread to monitor several channels and/or ports, only servicing those that are ready.

In order to communicate between two threads, two channel ends need to be allocated, one for each thread. This is done using the GETR CHAN instruction. The identifier of the channel end for the first thread must then be given to the second thread, and vice versa. The two threads can then use the resource identifiers to transfer messages using input and output instructions.

| | | |
|---|---|---|
| OUTT | d◁s | output token |
| OUTCT | d◁s | output control token |
| INT | d▷s | input token |
| OUT | d◁s | output data word |
| IN | d▷s | input data word |
| TESTCT | d ← isctoken(s) | test for control token |
| TESTWCT | d ← hasctoken(s) | test word for control token |

Each message starts with a header containing the other thread's resource identifier. This is usually followed by a series of data or control tokens, ending with an end or message (EOM) control token. The OUT and IN instructions are used to transmit words of data through the channel; to transmit bytes of data the OUTT, INTT, OUTTSHL and INTTSHL instructions are used. OUTTSHL and INTTSHL are shifting instructions which are used to optimise communication starting with the most significant bytes of a word and are mainly used in the construction of the routing addresses in message headers.

| | | |
|---|---|---|
| OUTTSHL channel, s | channel◁s[bits (bps − 8) for 8];<br>s ← s << 8 | output from<br>channel and shift |
| INTSHL channel, s | s ← s << 8;<br>channel▷s[bits 0 for 8] | shift and input<br>from port |

Channel ends have a buffer able to hold sufficient tokens to allow at least one word to be buffered. If an output instruction is executed when the channel is too full to take the data then the thread which executed the instruction is paused. It is restarted when there is enough room in the channel for the instruction to successfully complete. Likewise, when the instruction is executed and there is not enough data available, then the thread is paused and will be restarted or re-executed when enough data becomes available.

In order to send control tokens over a channel the OUTCT instruction is used. A control token takes up a single byte of storage in the channel. On the receiving end the software can test whether the next byte is a control token using the TESTCT instruction, which waits until at least one token is available. It is possible to test whether the next word contains a control token using the TESTWCT instruction which waits until at least one control token has been received or a whole data word has been received.

After testing that a token is a control token it can be received with the INT. Once the token has been received, there may be no way to check whether it was a control token. If the channel end contains a mixture of data and control tokens an IN instruction will return them all as data.

When it is no longer required, the channel can be freed using FREE CHAN instructions. Otherwise it can be used for another message.

The interconnect in a system is shared by all channels. Within a processor there are no constraints on connectivity so channel ends do not have to disconnect from each other to allow interconnect sharing. They will only have to disconnect if the target channel end is being shared with another channel end.

However, when connecting to a channel end on a different processor, it is useful to ensure that the interconnect is shared efficiently with other channels in the system. This is done by breaking data being transmitted into packets and messages. Each packet or message starts with the header and ends with an end of packet (EOP) or EOM control token.

Events and interrupts allow resources (ports and channels) to automatically transfer control to a predefined event handler. The ability of a thread to accept events or interrupts is controlled by information held in the thread status register SR (see FIG. 4), and may be explicitly controlled using TSE and TSD instructions. This information comprises an event enable flag (EE) and an interrupt enable flag (IE).

| TSE | s | SR ← SR∨s | thread state enable |
|---|---|---|---|
| TSD | s | SR ← SR∧¬s | thread state disable |

The operand of these instructions should be one of:

| EE | to enable or disable events |
|---|---|
| IE | to enable or disable interrupts |

Events are handled in the same scope in which they were set up. Hence, on an event all the thread's state is valid, allowing the thread to respond rapidly to the event. The thread can perform input and output operations using the port which gave rise to an event whilst leaving some or all of the event information unchanged. This allows the thread to complete handling an event and immediately wait for another similar event.

The program location of the event handler must be set prior to enabling the event using the SETV instruction. Ports have conditions which determine when they will generate an event; these are set using the SETC and SETD instructions. Channels are considered ready as soon as they contain enough data or have room to accept data for output.

Event generation by a specific port or channel can be enabled using an event enable unconditional (EEU) instruction and disabled using an event disable unconditional (EDU) instruction. The event enable true (EET) instruction enables the event if its condition operand is true and disables it otherwise; conversely the event enable false (EEF) instruction enables the event if its condition operand is false, and disabled it otherwise. These instructions are used to optimise the implementation of guarded inputs. Below are some example instruction formats for configuring events on ports, but it will be understood that the same instructions can apply in relation to channels.

| SETV port, v | port[vector] ← v | set event vector |
|---|---|---|
| SETD port, d | port[data] ← d | set event data |
| SETC port, c | port[ctrl] ← c | set event control |
| EET port, b | port[enable]← b; port[tid] ← thread | event enable true |
| EEF port, b | port[enable]←¬b; port[tid] ← thread | event enable false |
| EDU port | port[enable]← false; port[tid] ← thread | event disable |
| EEU port | port[enable]← true; port[tid] ← thread | event enable |

Having enabled events on one or more resources, a thread can use a WAITEU instruction to wait for at least one event. This may result in an event taking place immediately with control being transferred to the event handler specified by the corresponding event vector with events disabled by clearing the EE (event enable) flag. Alternatively the thread may be suspended until an event takes place—in this case the EE flag will be cleared when the event takes place, and the thread resumes execution.

| WAITET b | if b then SR[EE] ← true | event wait if true |
|---|---|---|
| WAITEF b | if¬ b then SR[EE] ← true | event wait if false |
| WAITEU | SR[EE] ← true | event wait |
| CLRE | SR[EE] ← false; forall port if port[tid] = thread then port[enable] ← false | disable all events for thread |

To optimise the common case of repeatedly waiting for one or more events until a condition occurs, conditional forms of the event wait instruction are provided. The WAITET instruction waits only if its condition operand is true, and the WAITEF waits only if its condition operand is false.

All of the events Which have been enabled by a thread can be disabled using a single CLRE instruction. This disables event generation in all of the ports which have had events enabled by the thread. The CLRE instruction also clears the event-enabled status in the thread's status register.

In order to optimise the responsiveness of a thread to high priority resources, the TSE EE instruction can be used to enable events on a thread first before subsequently starting to enable the ports and/or channels and using one of the event wait instructions. This way, the processor can scan through the resources in priority order. This may cause an event to be handled immediately as soon as it is enabled.

In contrast to events, interrupts are not handled within the current scope and so the current PC and SR (and potentially also some or all of the other registers) must be saved prior to execution of the interrupt handler. On an interrupt generated by resource r the following occurs automatically:
SAVEPC←PC;
SAVESR←SR;
SR[EE]←false;
SR[IE]←false;
PC←r[vector]

When the handler has completed, execution of the interrupted thread can be performed by an RFINT instruction.

| RFINT | PC ← SAVEPC; SR ← SAVESR | return from interrupt |
|---|---|---|

An interrupt could interrupt a thread whilst suspended awaiting an event.

So according to everything discussed above, multiple concurrent program threads can be scheduled based on a number of different factors. Since dependencies may exist between threads, particularly when threads communicate with one another, then some form of synchronisation is required to synchronise the execution of these threads.

Referring again to FIG. 2, the present invention achieves this synchronisation by providing a plurality of hardware synchroniser modules 60 which each contain logic for implementing barrier synchronisation techniques in hardware, rather than in software as in conventional processors. Each hardware synchroniser 60 can be allocated for use by any given thread, and de-allocated again once the required synchronisation or synchronisations have completed. Particularly, each synchroniser can be used for multiple synchronisations. Three synchronisers 60 are shown in FIG. 3 for illustrative purposes, but it will be understood that any number could be provided, preferably depending on the number of threads for which the processor is designed to cater (for m threads, there would preferably be m−1 synchronisers).

The synchronisers 60 work in conjunction with the thread scheduler 18 in order to pause and resume threads such that they are properly synchronised and the dependencies between them are satisfied, i.e. so that the correct order of execution is observed and one thread does not attempt to execute an instruction before an instruction in another thread upon which it depends.

In a group of two or more synchronised threads, one of those threads acts as the master thread and the remaining are slave threads.

The thread scheduler 18 maintains a set "mpaused" of paused master threads and a set "spaused" of paused slave threads, and also a set "minuse" of the available thread registers sets 20 which are not currently in use and therefore available for initiating new threads. The thread scheduler derives the run set, "run", from the set of in-use threads "inuse" less the set of paused slaves "spaused" and paused masters "mpaused". That is, in set notation:

run={thread ∈ threads: inuse}\(spaused ∪ mpaused)

Each synchroniser 60 comprises a master thread identifier register 66 which stores an identifier of a master thread. Each synchroniser 60 also comprises one or more slave thread identifier registers STID 61 which store identifiers of the slave threads for which that respective synchroniser 60 and its associated master thread are responsible. Two STID registers 61 are shown here for illustrative purposes, but it will be understood there may be more. The slave thread IDs in the STID registers 61 define a set "slaves" for each synchroniser 60 and its respective associate master thread. Note that although these STID registers 61 and MTID registers 66 are shown as being within the synchronisers 60, they may in fact be physically separated from the rest of the synchronisers' logic on the chip. Note that these registers save on synchronisation instructions because once the group is set up the master does not need to know the identity of its slaves, and the slaves never need to know the identity of their master, so these IDs do not need to be passed about by the threads when performing a synchronisation operation.

In practice, the thread IDs may be efficiently represented by a single bit for each thread For example, in each synchroniser 60, a one-bit register is provided for each thread which if asserted indicates that thread is a slave of that synchroniser. Similar one-bit registers can be provided to represent sets such as "inuse", "spaused" and "mpaused" in the thread scheduler 18. In this case, a union ("∪") can be efficiently performed by taking a bitwise OR of the bits, an intersection ("∩") by a bitwise AND, and a set difference ("\") by an AND NOT.

To create a group of synchronised threads, the master thread must first acquire a synchroniser 60. It does this by executing a "get synchroniser instruction" GETR SYNC which returns an identifier of a free synchroniser 60 (i.e. one unclaimed by another thread) if available. That is, the GETR SYNC instruction stores the ID of the available synchroniser 60 in an operand register of the master thread's register set 20. The master thread thus "knows" its associated synchroniser 60 and can use it to establish a group of synchronised slave threads. The GETR SYNC instruction also stores the master thread's ID in the synchroniser's MTID register 66. If no synchroniser 60 is available, i.e. because they are all allocated to other master threads of other groups, then an invalid ID is returned.

Assuming a synchroniser 60 has been successfully allocated, the next step is for the master is to create one or more synchronised slave threads with which it is to synchronise. This is done by the master executing a "get slave thread" instruction GETST, which takes the stored location of the synchroniser ID as an operand. The GETST instruction acts on the thread scheduler 18 to return the identifier of the next available thread register set 20 not in the set "inuse", if any, then adds that identifier to the set "minuse". This identifier acts as a thread identifier, or thread ID. The thread ID is also added to the set of paused slaves "spaused" maintained by the thread scheduler 18, and stored in the thread identifier register STID 61 of the master's associated synchroniser 60 as specified by the GETST instructions' operand.

So the operation of the thread scheduler 18 and allocated synchroniser 60 is equivalent to the following function if represented in "pseudo-code" and set notation:

GETST   d ← first thread ∈ threads : ¬ inuse$_{thread}$;   get synchronised thread
        inuse$_d$ ← true;
        spaused ← spaused ∪ {d}
        slaves$_s$ ← slaves$_s$ ∪ {d}

(where s is the source operand specifying the relevant synchroniser 60; and d is a temporary destination operand).

However, according to the present invention, this operation is implemented in hardware in the thread scheduler 18 and synchroniser 60, including by means of dedicated registers. The operation is thus advantageously triggered by the execution of a single GETST instruction in the master thread, and does not require the function to be coded into the thread.

When a thread is thus created, it begins in the paused state. Before it is un-paused, it's access registers must be initialised using the following instructions:

TINITPC   pc$_t$ ← s   set program counter (PC)
TINITSP   sp$_t$ ← s   set thread stack pointer (SP)
TINITDP   dp$_t$ ← s   set thread data pointer (DP)
TINITGP   cp$_t$ ← s   set thread global pool (GP)
TINITLR   lr$_t$ ← s   set thread link (LR) (primarily for debugging)

If required, the master thread can repeat the above process to create a group of more than two threads which all synchronise together.

Two further instructions, TSETR and TSETMR, are also available to transfer data between operand registers upon initialisation.

| TSETR | $d_t \leftarrow s$ | set thread operand register |
|---|---|---|
| TSETMR | $d_{mt} \leftarrow s$ | set master thread operand register |

Once a group is created and initialised, the synchronisation is controlled by means of "synchronisation points" within the threads. These synchronisation points are defined by certain synchronisation instructions at certain points within the sequences of instruction making up the threads. A thread can be said to have reached a synchronisation point once a synchronisation instruction is encountered within that thread. For the master thread, the synchronisation point is defined by either a "master synchronise" instruction MSYNC or a "master join" instruction MJOIN. For a slave thread, the synchronisation point is defined by a "slave synchronise" instruction SSYNC.

A "master synchronise" instruction MSYNC pauses the master thread until all of its slaves have reached their respective synchronisation point, then un-pauses both the slave and master threads allowing them each to continue. If all the slaves have already reached their synchronisation points when the MSYNC is encountered, then it does not pause the master thread. The MSYNC instruction is also used to initially start the slave threads after initialisation.

A "master join" instruction MJOIN also pauses the master thread until all of its slaves have reached their synchronisation points, but then terminates the slave threads. In this case, the master and slave threads can be thought of as having "joined" in the sense that they have converged to a single line of execution. When a thread terminates, its register set 20 is freed for use by subsequent new threads. If all the slaves have already reached their synchronisation points when the MJOIN is encountered, then it does not pause the master thread but does still terminates the slaves.

A "slave synchronise" instruction SSYNC pauses the slave until its master and any other co-synchronised slaves in the group have reached their synchronisation points. If all other threads in the group have already reached their synchronisation point when the SSYNC is encountered, then it does not pause.

Figure 7:
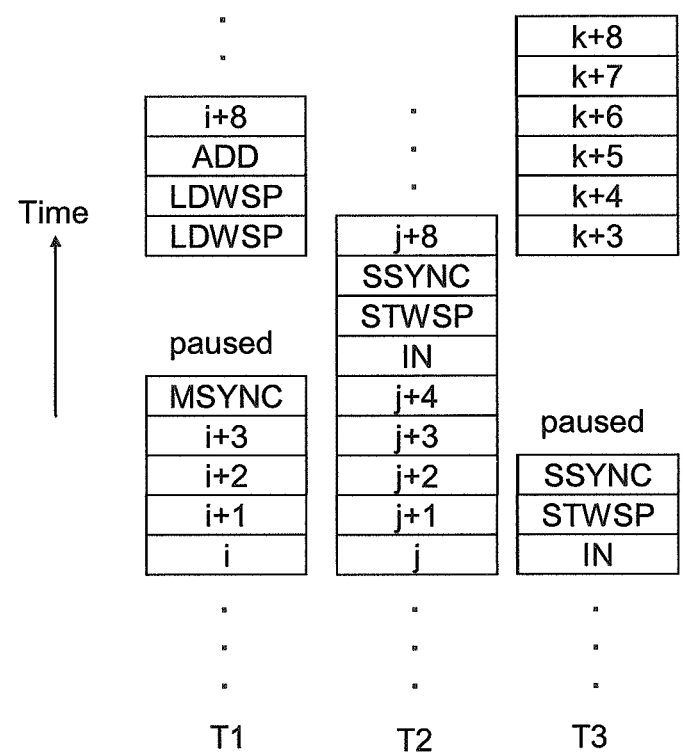
FIG. 7 is a schematic representation of an exemplary synchronisation of threads.

For example, FIG. 7 illustrates schematically instructions from program count i to i+8 making up part of a master thread T1, instructions from program count j to j+8 making up part of a co-synchronised slave thread T2, and instructions from program count k to k+8 making up part of another co-synchronised slave thread T3. The three threads T1, T2 and T3 have been grouped for synchronisation under the control of the master thread T1 and an associated synchroniser 60, in the manner discussed above.

In this example, the slave threads T2 and T3 could be for handling input from two respective ports 22. T2 stores a result in a stack based on its respective input at program count j+6 using an STWSP instruction, and T3 stores a result in a stack based on its respective input at program count k+1 using an STWSP instruction. The master thread T1 is to load these results from the stack at program counts i+5 and i+6 using two LDWSP instructions, then add these results at program count i+7 using an ADD instruction. The master thread T1 is therefore dependent on the results stored by the slave threads T2 and T3. Because of this dependency, the master thread T1 must not attempt to execute the ADD instruction until both the slave threads T2 and T3 have executed their respective STWSP instructions. However, the input from the ports 22 may be unpredictable from the program's point of view, for example if threads T2 and T3 were earlier paused awaiting that input. The relative alignment of the threads' program counts is therefore in general unknown, and synchronisation is required to ensure the correct order of execution.

This synchronisation is achieved in the example of FIG. 7 by including an MSYNC instruction at program count i+4 in the master thread T1, an SSYNC instruction at program count j+7 in slave thread T2, and an SSYNC instruction at program count k+2 in slave thread T3. So at program count k+3, the slave thread T3 reaches its synchronisation point. When executed by the execution unit 16, the SSYNC instruction causes the thread scheduler 18 and synchroniser 60 to determine whether the other threads T1 and T2 have reached their synchronisation points yet. Determining that they have not, T3 is paused. At program count i+4, the master thread T1 reaches its synchronisation point. When executed by the execution unit 16, the MSYNC instruction causes the thread scheduler 18 and synchroniser 60 to determine whether the other threads T2 and T3 have reached their synchronisation points yet. Determining that T3 has but T2 has not, T1 pauses. At program count j+7, the slave thread T2 reaches its synchronisation point. When executed by the execution unit 16, the SSYNC instruction causes the thread scheduler 18 and synchroniser 60 to determine whether the other threads T1 and T3 have reached their synchronisation points yet. Determining that they have, T1 and T3 are un-paused and all of T1 to T3 continue executing. This includes at program count i+6 the master thread T1 adding the results from T2 and T3.

In low-level code, the example of FIG. 7 looks like this:
T1:
MSYNC
LDWSP r0, x
LDWSP r1, y
ADD r2, r0, r1
T2:
IN r0, port1
STWSP r0, x
SSYNC
T2:
IN r0, port2
STWSP r0, y
SSYNC In the example of FIG. 7, the MSYNC instruction in the master thread T1 could alternatively be replaced by an MJOIN instruction. This would cause the slave thread T2 to terminate after program count j+7 and the slave thread T3 to terminate after program count k+3.

As shown in FIG. 2, each synchroniser 60 comprises two flags (i.e. one-bit registers), an "msyn" flag 62 which records whether the master thread has reached a synchronisation point, and a "mjoin" flag 63 which records whether the master thread intends to terminate the slave threads once the synchronisation points are reached. As with the STID registers 61 and MTID registers 66, although these flags 62 and 63 are shown as being within the synchronisers 60, these may in fact be physically separated from the rest of the synchronisers' logic on the chip.

Figure 8:
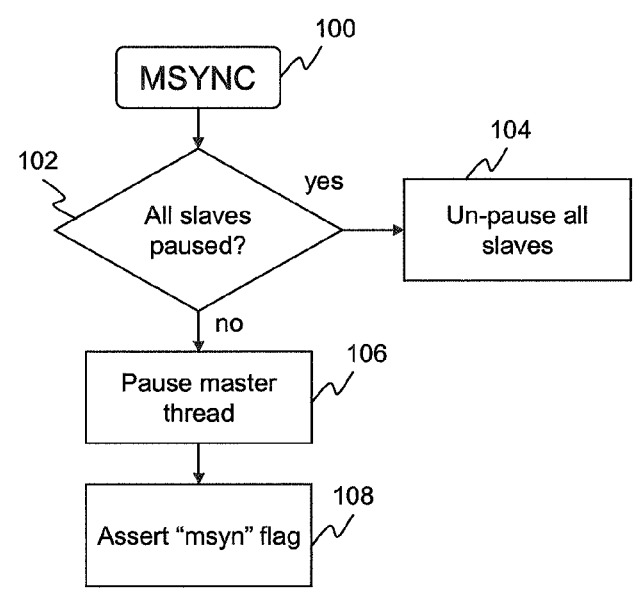
FIG. 8 is a flow chart showing the operation of a master synchronise instruction.

FIG. 8 is a flow chart showing the operation of the thread scheduler 18 and synchroniser 60 as invoked by an MSYNC instruction in the master thread. The method begins at step 100 with the execution of an MSYNC instruction by the execution unit 16. At step 102, the thread scheduler 18 in conjunction with the master thread's associated synchroniser 60 determines whether all of the master's co-synchronised slave threads are paused. If so, the thread scheduler 18 and synchroniser 60 un-pause the slave threads at step 104. If not, they pause the master thread step 106, and assert the "msyn" flag 62 at step 108 in order to indicate that the master thread has reached its synchronisation point.

This operation is equivalent to the following function if represented in high-level "pseudo-code" and set notation:

| | | |
|---|---|---|
| MSYNC | if (slaves$_s$ \ spaused = Ø) | master synchronise |
| | then { | |
| | spaused ← spaused \ slaves$_s$ } | |
| | else { | |
| | mpaused ← mpaused ∪ {mtid}; | |
| | msyn$_s$ ← true } | |

(where s is a source operand specifying the relevant synchroniser 60, msyn$_s$ is the msyn flag 62 associated with that synchroniser 60, and mtid is the identifier of the currently executing master thread as stored in the MTID register 66).

Figure 9:
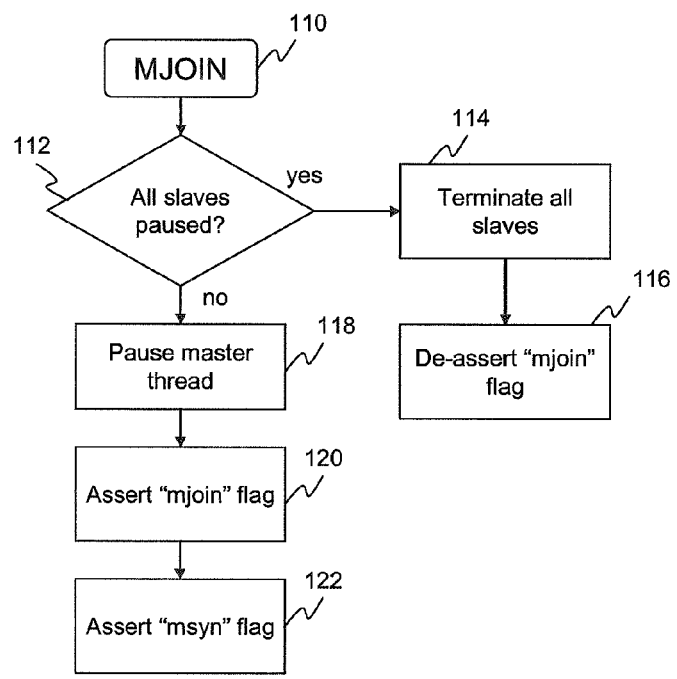
FIG. 9 is a flow chart showing the operation of a master join instruction.

FIG. 9 is a flow chart showing the operation of the thread scheduler 18 and synchroniser 60 as invoked by an MJOIN instruction in the master thread. The method begins at step 110 with the execution of an MJOIN instruction by the execution unit 16. At step 112, the thread scheduler 18 in conjunction with the master thread's associated synchroniser 60 determines whether all of the master's co-synchronised slave threads are paused. If so, the thread scheduler 18 and synchroniser 60 terminate all the slave threads at step 114 by removing them from the "inuse" set, and de-assert the "mjoin" flag 63 at step 116. If not, they pause the master thread at step 118, assert the "mjoin" flag 63 at step 120 to indicate that the master intends to terminate the slaves once they all reach their synchronisation points, and assert the "msyn" flag 62 at step 122 to indicate that the master has reached its own synchronisation point.

This operation is equivalent to the following function if represented in high-level pseudo-code and set notation:

| | | |
|---|---|---|
| MJOIN | if (slaves$_s$ \ spaused = Ø) | master join |
| | then { | |
| | forall thread ∈ slaves$_s$ : inuse$_{thread}$ ← false; | |
| | mjoin$_s$ ← false } | |
| | else { | |
| | mpasued ← mpasued ∪ {mtid}; | |
| | mjoin$_s$ ← true; | |
| | msyn$_s$ ← true} | |

(where mtid is the identifier of the currently executing master thread as stored in the MTID register 66; s is a source operand specifying that synchroniser 60; msyn$_s$ is the msyn flag 62 associated with that synchroniser 60; mjoin$_s$ is the mjoin flag 63 associated with that synchroniser 60; and slaves$_s$ is the set of slaves associated with that synchroniser, as identified by the STID registers 61).

Figure 10:
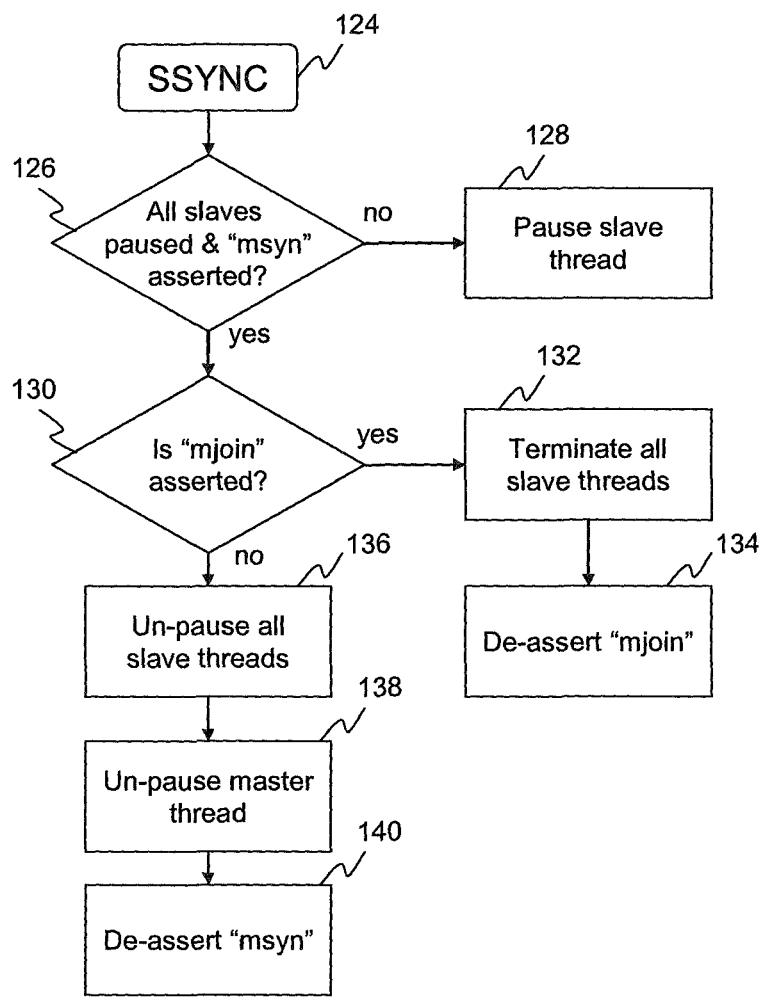
FIG. 10 is a flow chart showing the operation of a slave synchronise instruction.

FIG. 10 is a flow chart showing the operation of the thread scheduler 18 and synchroniser 60 as invoked by an SSYNC instruction in a slave thread. The method begins at step 124 with the execution of an SSYNC instruction by the execution unit 16. At step 126 the thread scheduler 18 and synchroniser 60 determine whether all other slave threads are paused, and also whether the "msyn" flag 62 is asserted in order to determine whether the master has reached its synchronisation point. If both conditions are not satisfied, the thread scheduler 18 and synchroniser 16 pause the currently executing slave thread at step 128. If both conditions are satisfied, the method progresses to step 130 where the thread scheduler 18 and synchroniser 60 determine whether the "mjoin" flag 63 is asserted". If so, the thread scheduler 18 and synchroniser 60 terminate all of the co-synchronised slave threads (including the current slave thread) at step 132 by removing them from the "inuse" set, and de-assert the "mjoin" flag 63 at step 134. If not, they un-pauses all of the co-synchronised slave threads (including the current slave thread) at step 136, un-pause the master thread at step 138, and de-assert the "msyn" flag 62 at step 140.

This operation is equivalent to the following function if represented in high-level pseudo-code and set notation:

| | | |
|---|---|---|
| SSYNC | if (slaves$_{syn(tid)}$ \ spaused = Ø) ^ msyn$_{syn(stid)}$ | slave synchronise |
| | then { | |
| | if mjoin$_{syn(stid)}$ | |
| | then { | |
| | forall thread ∈ slaves$_{syn(stid)}$ : inuse$_{thread}$ ← false; | |
| | mjoin$_{syn(stid)}$ ← false; | |
| | else { | |
| | spaused ← spaused \ slaves$_{syn(stid)}$; | |
| | mpasued ← mpasued \ {master$_{syn(stid)}$}; | |
| | msyn$_{syn(stid)}$ ← false } | |
| | else | |
| | spaused ← spaused ∪ {stid} | |

(where stid is the identifier of the currently executing slave thread; syn(stid) is the synchroniser 60 associated with that slave thread; master$_{syn(stid)}$ is the master thread associated with that synchroniser 60 and slave thread, as identified in the MTID register 66; msyn$_{syn(stid)}$ is the msyn flag 62 associated with that synchroniser 60; and slaves$_{syn(stid)}$ is the set of co-synchronised slaves associated with that synchroniser 60, as identified in the STID registers 61).

Note especially that each of the above operations is invoked by a single instruction within a thread, which triggers the thread scheduler 18 and the allocated synchroniser 60 to perform the operation in hardware, including by means of dedicated registers and flags, rather than in software. Thus advantageously, the functionality does not need to be coded into the thread.

A master thread can also create unsynchronised threads which can terminate themselves. This is done by executing a GETR THREAD instruction. This instruction returns either a thread ID if there is a free thread or the invalid resource ID if there is not. The unsynchronised thread can be initiated in the same way as a synchronised thread using the TINITPC, TIINITSP, TINITDP, TINITGP and TINITLR instructions.

Then the unsynchronised thread is started by the master executing a TSTART instruction specifying the thread ID. Once the thread has completed its task it can terminate itself it can terminate itself with a FREET instruction.

| | | |
|---|---|---|
| TSTART | spaused ← spaused \ {tid} | start thread |
| FREET | inuse$_{tid}$ ← false | free thread |

A further example of some synchronisation code is given below. It is common to perform input and output at the same time. The following code repeatedly inputs x whilst it outputs y, then inputs y whilst it outputs x, until x equals zero. The high-level code looks like this:

```
while x != 0
{ { port1 ? x || port2 ! y };
  { port1 ? y || port2 ! x }
}
```

When optimised according to the present invention, this turns into low-level code as follows. It creates a new thread T2 to execute the outputs; the main thread T1 does the inputs:

```
T1:
    GETR r0, SYNC
    GETST r1, r0
    LDAPF r2, T2         // load address for thread 2's PC
    INITPC r1, r2
    LDASP r3, T2stack    // get SP for thread 2
    INITSP r1, r3, SP
    MSYNC
LOOP1:
    IN r0, port1
    STWSP r0, x
    MSYNC
    IN r1, port2
    STWSP r1, y
    MSYNC
    BBF r0, LOOP1        // branch
    MJOIN
T2:
    SSYNC
LOOP2:
    LDWSP r0, y
    OUT r0, port2
    SSYNC
    LDWSP r1, x
    OUT r1, x
    SSYNC
    BBF r1, LOOP2
    SSYNC
```

Note particularly that in this example, one synchroniser is used to perform multiple synchronisation optimisations, pausing and un-pausing the same threads T1 and T2 without terminating them. This advantageously avoids the need to repeatedly create and terminate threads for the purpose of synchronisation.

It will be appreciated that the above embodiments are described only by way of example. In other embodiments, different sets of registers and instructions may be provided depending on the desired specifications of the processor. Different arrangements of flags and/or registers could be used to associate synchronisers 60 with threads, for example by including a master thread identifier register in each synchroniser 60, or by storing the synchronised thread IDs or master thread's flags in the thread registers 20 or thread scheduler 18. Other arrangements may also be apparent to a person skilled in the art given the disclosures of the present application. Different instructions sets could also be used for synchronising threads and allocating them to synchronisers 60, for example using a single long instruction to associate both a master and a slave thread with a synchroniser 60. Furthermore, threads may be scheduled based on activity from other sources other than ports and channels. Different interconnects may be provided between the various components of the processor. Also, the invention is not specific to use in a mobile terminal with a mobile applications processor. Other applications and configurations will be apparent to the person skilled in the art. The scope of the invention is not limited by the described embodiments, but only be the following claims.

The invention claimed is:

1. A processor comprising:
an execution unit arranged to execute multiple program threads, each thread comprising a sequence of instructions; and
a plurality of synchroniser modules comprising dedicated hardware logic for synchronising threads including respective synchronisation registers operable to store synchronisation information relating to the synchronisation of the threads;
wherein the dedicated hardware logic of each of said synchroniser modules is operable, in response to execution by the execution unit of one or more synchroniser allocation instructions, to associate with a group of at least two threads by storing synchronisation information relating to that group in the synchronisation registers; and
wherein the dedicated hardware logic of each of said synchroniser modules is operable, when thus associated, to synchronise the threads of said group by pausing execution of a thread in the group pending a synchronisation point in another thread of that group, the synchronisation information relating to the associated group remaining stored, and the dedicated hardware logic thereby remaining thus associated, following said synchronisation point.

2. The processor according to claim 1, wherein each of said synchroniser modules is operable to subsequently de-associate from said group in response to execution by the execution unit of at least one synchroniser de-association instruction.

3. The processor according to claim 2, wherein at least one of said plurality of synchroniser modules synchronisers is operable to perform multiple synchronisation operations on said group before de-associating from said group.

4. The processor according to claim 1, wherein the group comprises a master thread and one or more slave threads.

5. The processor according to claim 4, wherein the master thread includes a master synchronise instruction which defines a synchronisation point in the master thread.

6. The processor according to claim 5, comprising a hardware thread scheduler configured to maintain a set of runnable threads, wherein the plurality of synchroniser modules are operable in conjunction with the thread scheduler to pause the respective threads by removing them from the set of runnable threads; wherein when executed by the execution unit, the master synchronise instruction causes the thread scheduler in conjunction with the associated synchroniser module to determine whether all of the one or more slave threads in said group are paused, and on the condition that they are to un-pause the slaves of the group, and on the condition that they are not to pause the master thread.

7. The processor according to claim 6, wherein said synchroniser registers in each of the synchroniser modules comprise a respective first flag operable to record whether the master thread has reached a synchronisation point, wherein on the condition that all of the one or more slave threads in said group are not paused, the master synchronise instruction asserts the first flag of the associated synchroniser.

8. The processor according to claim 4, wherein the master thread includes a master join instruction which defines a synchronisation point in the master thread.

9. The processor according to claim 8, wherein when executed by the execution unit, the master join instruction causes the thread scheduler in conjunction with the associated synchroniser module to determine whether all of the one or more slave threads in said group are paused, and on the condition that they are to terminate all of the slave threads of the group, and on the condition that they are not to pause the master thread.

10. The processor according to claim 9, wherein said synchroniser registers in each of the synchroniser modules comprise a respective first flag operable to record whether the master thread has reached a synchronisation point; wherein said synchroniser registers in each of the synchroniser modules comprise a respective second flag operable to record whether the one or more slave threads of said group are to be terminated once all threads in that group are synchronised; wherein on the condition that all of the one or more slave threads of said group are not paused, the master join instruction asserts the first flag and the second flag of the associated synchroniser module.

11. The processor according to claim 10, wherein on the condition that all of the one or more slave threads of said group are paused, the master join instruction de-asserts the second flag of the associated synchroniser module.

12. The processor according to claim 4, wherein the one or more slave threads each include a slave synchronise instruction which each define a respective synchronisation point in the respective slave thread.

13. The processor according to claim 12 comprising a hardware thread scheduler configured to maintain a set of runnable threads, wherein the plurality of synchroniser modules are operable in conjunction with the thread scheduler to pause the respective threads by removing them from the set of runnable threads; wherein said synchroniser registers in each of the synchroniser modules comprise a respective first flag operable to record whether the master thread has reached a synchronisation wherein said synchroniser registers in each of the synchroniser modules comprise a respective second flag operable to record whether the one or more slave threads of said group are to be terminated once all threads in that group are synchronised; wherein when executed by the execution unit, the slave synchronise instruction causes the thread scheduler in conjunction with the associated synchroniser module to: determine whether there are any other slave threads in said group which are not paused; determine by reference to the first flag of the associated synchroniser module whether the master thread of said group has reached its synchronisation point; on the condition that any other slave threads in said group are not paused or the master thread has not reached its synchronisation point, to pause the slave thread containing said slave synchronise instruction; and on the condition that there are no other slave threads in said group which are not paused and the master thread has reached its synchronisation point, to un-pause the master thread, to terminate the one or more slave threads if the second flag of the associated synchroniser module is asserted, and to un-pause the one or more slave threads if the second flag of the associated synchroniser module is not asserted.

14. The processor according to claim 1, wherein said synchronisation registers in each of said synchroniser modules comprise one or more identifier registers operable to store one or more thread identifiers for use in associating the synchroniser modules with threads.

15. The processor according to claim 14, wherein the group comprises a master thread and one or more slave threads, and at least one of said synchroniser association instructions is a get slave instruction which, when executed by the execution unit, acts to store an identifier of the one or more slave thread in one of said identifier registers.

16. The processor according to claim 14, wherein the group comprises a master thread and one or more slave threads, and at least one of said synchroniser association instructions is a get synchroniser instruction which, when executed by the execution unit, acts to store an identifier of said master thread in one of said identifier registers.

17. The processor according to claim 1, comprising a plurality of sets of thread registers, each thread register set being arranged to store information relating to a respective thread and to maintain that stored information if and whilst the respective thread is paused.

18. The processor according to claim 17, wherein one of said synchroniser association instructions is a get synchroniser instruction which, when executed by the execution unit, acts to return an identifier of an available synchroniser module to a thread register of the master thread.

19. The processor according to claim 17, wherein each of said thread register sets comprises at least one of: a plurality of operand registers for storing operands of the respective thread, a program counter register for storing a program count of the thread, and a status register for storing information determining how the thread reacts to events or interrupts.

20. The processor according to claim 17, comprising: a hardware thread scheduler configured to maintain a set of runnable threads, wherein the plurality of synchroniser modules are operable in conjunction with the thread scheduler to pause the respective threads by removing them from the set of runnable threads; and an interconnect system for establishing at least one channel between said sets of thread registers, wherein the thread register is operable to pause a thread pending a specified activity occurring over said channel.

21. The processor according to claim 1, wherein the group comprises a master thread and one or more slave threads, and wherein said synchroniser registers in each of the synchronisers modules comprise a respective first flag operable to record whether the master thread has reached a synchronisation point.

22. The processor according to claim 1, wherein the group comprises a master thread and one or more slave threads, and wherein said synchroniser registers in each of the synchronisers modules comprise a respective second flag operable to record whether the one or more slave threads of said group are to be terminated once all threads in that group are synchronised.

23. The processor according to claim 1, comprising a hardware thread scheduler configured to maintain a set of runnable threads, wherein the plurality of synchronisers modules are operable in conjunction with the thread scheduler to pause the respective threads by removing them from the set of runnable threads.

24. The processor according to claim 23, comprising at least one port for communicating with an external device, wherein the thread scheduler is operable to pause a thread pending a specified activity occurring at said port.

25. The processor according to claim 1, wherein each of said synchroniser modules is operable to subsequently de-associate from said group to be associated with a different group of threads, and to synchronise the different group, such that each of the synchroniser modules can be used for multiple synchronisations for different groups of threads.

26. The processor according to claim 1, wherein at least one of said synchroniser association instructions, when executed on the execution unit, both creates one of the threads of the group and associates said one of threads with the synchroniser module when created.

27. The processor according to claim 1, wherein the group comprises a master thread and one or more slave threads, and at least one of said synchroniser association instructions is a get slave instruction which, when executed by the master thread running on the execution unit, both creates one of the one or more slave threads and associates said one of the slave threads with the synchroniser module when it creates the slave thread.

28. A method of synchronising multiple program threads, each thread comprising a sequence of instructions, the method comprising: providing a plurality of synchroniser modules each comprising dedicated hardware logic for synchronising threads including respective synchronisation registers operable to store synchronisation information relating to the synchronisation of the threads; associating the dedicated hardware logic one of said synchroniser modules with a group of at least two threads by executing one or more synchroniser association instructions which stores synchronisation information relating to that group in the synchronisation registers; operating the dedicated hardware logic of said synchroniser module to synchronise the threads of said group by pausing execution of a thread in the group pending a synchronisation point in another thread of that group; and wherein the synchronisation information relating to the associated group remains stored, and the dedicated hardware logic thereby remains thus associated, following said synchronisation point.

29. The method according to claim 28, comprising subsequently de-associating said synchroniser module from said group by executing one or more synchroniser de-association instructions.

30. The method according to claim 28, comprising allocating one of the group as a master thread and the one or more others of said group as slave threads.

31. The method according to claim 30, wherein the master thread includes a master synchronise instruction which defines a synchronisation point in the master thread.

32. The method according to claim 31, wherein the method comprises executing the master synchronise instruction and, as a result, determining whether all of the one or more slave threads in said group are paused, and on the condition that they are un- pausing the slaves of the group, and on the condition that they are not, pausing the master thread.

33. The method according to claims 32, wherein said synchroniser registers in each of the synchroniser modules comprise a respective first flag, the method comprising asserting the first flag of the associated synchroniser module on the condition that all of the one or more slave threads in said group are not paused.

34. The method according to claim 30, wherein the master thread includes a master join instruction which defines a synchronisation point in the master thread.

35. The method according to claim 30, wherein the one or more slave threads each include a slave synchronise instruction which each define a respective synchronisation point in the respective slave thread.

36. The method according to claim 28, wherein said synchronisation registers in each of said synchroniser modules comprise one or more identifier registers, and said step of associating comprises storing one or more thread identifiers in the identifier registers of the associated synchroniser module.

37. The method according to claim 36, wherein the group comprises a master thread and one or more slave threads, and at least one of said synchroniser association instructions is a get slave instruction which acts to store an identifier of a slave thread in one of said identifier registers.

38. The method according to claim 36, wherein the group comprises a master thread and one or more slave threads, and at least one of said synchroniser association instructions is a get synchroniser instruction which acts to store an identifier of said master thread in one of said identifier registers.

39. The method according to claim 28, comprising operating said associated synchroniser module to perform multiple synchronisation operations on said group before de-associating from said group.

40. The method according to claim 28, comprising storing information relating to each of said multiple threads in a respective set of thread registers, and maintaining that stored information if and whilst the respective thread is paused.

41. The method according to claim 40, wherein one of said synchroniser association instructions is a get synchroniser instruction which acts to return an identifier of an available synchroniser to a thread register of the master thread.

42. The method according to claim 40, wherein each of said thread register sets comprises at least one of: a plurality of operand registers for storing operands of the respective thread, a program counter register for storing a program count of the thread, and a status register for storing information determining how the thread reacts to events or interrupts.

43. The method according to claim 40, comprising pausing a thread pending a specified activity occurring over a channel between thread register sets.

44. The method according to claim 28, wherein the group comprises a master thread and one or more slave threads, said synchroniser registers in each of the synchronisers modules comprise a respective first flag, and the method comprises using the first flag of said associated synchroniser module to record whether the master thread has reached a synchronisation point.

45. The method according to claim 44, wherein the master thread includes a master join instruction which defines a synchronisation point in the master thread, the method comprising executing the master join instruction and, as a result, determining whether all of the one or more slave threads in said group are paused, and on the condition that they are terminating all of the slave threads of the group, and on the condition that they are not pausing the master thread.

46. The method according to claim 44, wherein said synchroniser registers in each of the synchroniser modules comprise a second flag, the method comprising asserting the first flag and the second flag of the associated synchroniser module on the condition that all of the one or more slave threads of said group are not paused.

47. The method according to claim 46, comprising de-asserting the second flag of the associated synchroniser module on the condition that all of the one or more slave threads of said group are paused.

48. The method according to claim 44, wherein said synchroniser registers in each of the synchroniser modules comprise first and second flags, the method comprising: using the first flag of said associated synchroniser module to record whether the master thread has reached a synchronisation point;
  using the second flag of said associated synchroniser module to record whether the one or more slave threads of said group are to be terminated once all threads in that group are synchronised; executing the slave synchronise instruction and, as a result:
  determining whether there are any other slave threads in said group which are not paused; determining by reference to the first flag of the associated synchroniser module whether the master thread of said group has reached its synchronisation point; on the condition that any other slave threads in said group are not paused or the master thread has not reached its synchronisation point, pausing the slave thread containing said slave synchronise instruction; and on the condition that there are no other slave threads in said group which are not paused and the master thread has reached its synchronisation point, un-pausing the master thread, terminating the one or more slave threads if the second flag of the associated synchroniser module is asserted, and un-pausing the one or more slave threads if the second flag of the associated synchroniser module is not asserted.

49. The method according to claim 28, wherein the group comprises a master thread and one or more slave threads, said synchroniser registers in each of the synchronisers modules comprise a respective second flag, and the method comprises using the second flag of said associated synchroniser module to record whether the one or more slave threads of said group are to be terminated once all threads in that group are synchronised.

50. The method according to claim 28, comprising maintaining a set of runnable threads, and pausing threads by removing them from the set of runnable threads.

51. The method according to claim 50, comprising pausing a thread pending a specified activity occurring at a port.

52. The method according to claim 28, further comprising subsequently de-associating said synchroniser module from said group associating the synchroniser module with a different group of threads, and using the synchroniser module to synchronise the different group of threads, so that the synchroniser module is used for multiple synchronisations for different groups of threads.

53. The method according to claim 28, wherein at least one of said synchroniser association instructions, when executed on the execution unit, both creates one of the threads of the group and associates said one of threads with the synchroniser module when created.

54. The method according to claim 28, wherein the group comprises a master thread and one or more slave threads, and at least one of said synchroniser association instructions is a get slave instruction which, when executed by the master thread running on the execution unit, both creates one of the one or more slave threads and associates said one of the slave threads with the synchroniser module when it creates the slave thread.

55. A mobile terminal having a processor comprising: an execution unit arranged to execute multiple program threads, each thread comprising a sequence of instructions; and a plurality of synchroniser modules each comprising dedicated hardware logic for synchronising threads including respective synchronisation registers operable to store synchronisation information relating to the synchronisation of the threads; wherein the dedicated hardware logic of each of said synchroniser modules is operable, in response to execution by the execution unit of one or more synchroniser association instructions,
to associate with a group of at least two threads by storing synchronisation information relating to that group in the synchronisation registers; and wherein the dedicated hardware logic of each of said synchroniser modules is operable, when thus associated, to synchronise the threads of said group by pausing execution of a thread in the group pending a synchronisation point in another thread of that group, the synchronisation information relating to the associated group remaining stored, and the dedicated hardware logic thereby remaining thus associated, following said synchronisation point.

56. A computer program product for synchronising multiple program threads, each thread comprising a sequence of instructions, the program being embodied on a non-transitory computer-readable medium and comprising code which when executed by a computer performs the steps of:
associating one of a plurality of synchroniser modules with a group of at least two threads as a result of one or more synchroniser association instructions, each of said synchroniser modules comprising dedicated hardware logic for synchronising threads;
operating the dedicated hardware logic of said associated synchroniser module to synchronise the threads of said group by pausing execution of a thread in the group pending a synchronisation point in another thread of that group, wherein the dedicated hardware logic remains associated with the group of at least two threads following that synchronisation point;
and
wherein the dedicated hardware logic of each of said synchroniser modules includes synchronisation registers, and said code when executed, stores information relating to the synchronisation of the threads of the associated group in said synchronisation registers.

57. A processor comprising: execution means for executing multiple program threads, each thread comprising a sequence of instructions; and a plurality synchronisation module means each comprising dedicated hardware logic means for synchronising threads including respective synchronisation register means for storing information relating to the synchronisation of the threads, and each for associating with a group of at least two threads in response to execution by the execution means of one or more synchroniser association instructions by storing synchronisation information relating to that group in the register means; wherein the dedicated hardware logic means of each of the synchronisation means, when thus associated, is further for synchronising the threads of said group by pausing execution of a thread in the group pending a synchronisation point in another thread of that group, the synchronisation information relating to the associated group remaining stored, and the dedicated hardware logic means thereby remaining thus associated, following said synchronisation point.

* * * * *